2,827,492
PROCESS OF MAKING ARYL THIOETHERS

Llewellyn W. Fancher, Pleasant Hill, Calif., assignor to Stauffer Chemical Company, a corporation of Delaware No Drawing. Application January 16, 1956
Serial No. 559,093

9 Claims. (Cl. 260—609)

This invention relates to a novel method of making aryl thioethers of the general formula:

$$R—SCH_2X$$

In the above formula, R is an aryl radical or a substituted aryl radical wherein the substituent is a halogen, a nitro group, or an organic radical such as $CH_3—$, $OCH_3$, $CH_3CONH—$, $—COOH$, or the like. X is chlorine or bromine.

Such compounds have been prepared in the past by methods including the reaction of aryl mercapto methane sulfonic acid salts with phosphorus or sulfur halides or oxyhalides; the halogenation of thio anisole or substituted thio anisoles, the chlorination of diaryl monosulfides at low temperatures, and the reaction of thiophenols, formaldehyde and anhydrous HCl at low temperatures. The compounds can also be prepared from alkali metal salts of thiophenols and a large excess of bromochloromethane.

The above methods all have some disadvantages such as in low yield, the production of undesirable by-products, and the use of several steps, involving intermediate purifications, to obtain the necessary starting materials.

According to the present invention, it has been found that the halogenated thioethers can be made in high yield at ambient room temperatures or slightly above by reacting thiophenols with paraformaldehyde and concentrated aqueous halogen acids as the sole source of halogen acid. Thus, the starting materials are relatively inexpensive since it is not necessary to employ anhydrous halogen acids and high yields, in the neighborhood of 90–96%, are readily obtained of a product of relatively high purity, i. e., from 93–97%. Because of the high yields and purity of the products produced by the present invention, distillation of the product for ordinary commercial uses is unnecessary.

The following non-limiting examples illustrate the invention.

*Example 1—p-Chlorophenyl chloromethyl sulfide.—* Into a 500 ml. round-bottomed flask equipped with a stirrer, thermometer and addition funnel were placed 7.5 g. (0.25 M) of paraformaldehyde and 50 cc. of benzene. The mixture was stirred at room temperature (26° C.) and 100 cc. of concentrated hydrochloric acid was added over a five minute period. The temperature dropped to 21° C. during the acid addition. The mixture was stirred for ten minutes then warmed to 30° C. and a solution of 28.9 g. (0.2 M) of p-chlorothiophenol dissolved in 50 cc. of benzene was added dropwise over a twenty-five minute period. The temperature was so regulated by means of a warm-water bath that the addition of the p-chlorothiophenol solution was accomplished in the neighborhood of 40° C. After all of the p-chlorothiophenol solution had been added, the temperature of the reaction mixture was raised to 50° C. and the mixture stirred at 48–52° C. for two hours. After cooling to room temperature, the bottom acid layer was drawn off and the upper benzene layer washed twice with 150 ml. portions of cold water. The benzene solution of the product was dried over anhydrous magnesium sulfate, filtered and the filtrate concentrated on the steam-bath. Final stripping of the benzene was accomplished on the steam-bath with an air jet. The product, a nearly colorless liquid, weighed 37.2 gms. (96.4% of theory). $N_D^{30}=1.6014$. Infrared analysis indicated that the product consisted of 97% p-chlorophenyl chloromethyl sulfide, $ClC_6H_4SCH_2Cl$.

*Example 2.—p-Bromophenyl chloromethyl sulfide.—* In essentially the same manner as in Example 1, the p-bromophenyl derivative was prepared using 4.5 gm. (0.15 M) of paraformaldehyde, 50 cc. of concentrated hydrochloric acid and 18.9 gms. (0.1 M) of p-bromothiophenol. The yield of nearly colorless liquid was 21.6 gms. (91.1% of theory). $N_D^{25}=1.6228$.

*Example 3.—o-Methyl phenyl chloromethyl sulfide.—* Similarly prepared was the o-methyl phenyl derivative from 4.5 gms. (0.15 M) of paraformaldehyde, 50 cc. of concentrated hydrochloric acid and 12.4 gms. (0.1 M) of o-toluene thiol. The yield was 15.9 gms. (91.9% of theory). $N_D^{26}=1.5853$.

*Example 4.—p-Methoxy phenyl chloro methyl sulfide.—* Nine grams (0.3 M) of paraformaldehyde was mixed with 50 cc. of benzene. Without cooling, 100 cc. of concentrated hydrochloric acid was added fairly rapidly. The temperature of the reaction mixture dropped slightly. The mixture was stirred and warmed to 30° C. and a solution of 24.0 grams (0.17 M) of p-methoxythiophenol in 50 cc. of benzene was added dropwise over a thirty minute period. The temperature was kept at 36°–40° C. during the thiol addition. The mixture was then warmed to 45° C. and stirred at 45°–47° C. for one hour. After cooling and transferring to a separatory funnel, the bottom acid layer was wtihdrawn and the upper benzene layer washed twice with cold water (100 cc. portions) and dried over anhydrous $MgSO_4$. The dried benzene solution was filtered and the benzene removed on the steam-bath. The product, a yellow liquid, weighed 29.5 grams. $N_D^{30}=1.5829$.

*Example 5.—3-chloro-4-methyl phenyl chloromethyl sulfide.—* From 24.0 grams (0.15 M) of 3-chloro-4-methyl thiophenol, 7.5 grams (0.25 M) of paraformaldehyde, and 100 cc. of concentrated hydrochloric acid, there was obtained 28.8 grams of 3-chloro-4-methyl phenyl chloromethyl sulfide, a light-yellow liquid. $N_D^{30}=1.5949$.

*Example 6.—p-Chlorophenyl chloromethyl sulfide.—* Into a 500 cc. round-bottomed flask having a thermometer, stirrer and addition funnel was placed 19 cc. of 40% formalin equivalent to 7.5 grams (0.25 M of HCHO), and 50 cc. of benzene. With stirring and water cooling, 125 cc. of concentrated hydrochloric acid was added over a 5 minute period, keeping the temperature between 20°–25° C. by the rate of addition. The temperature was then raised to 39° C. and a solution of 28.9 grams (0.2 M) of p-chlorothio phenol dissolved in 50 cc. of benzene was added dropwise over a 0.5 hour period, the temperature being maintained between 38°–40° C. during the thiol addition. The temperature was then raised to 50° C. and the mixture stirred at 48°–52° C. for 1.5 hours. After cooling to 25° C., the bottom acid layer was removed and the upper benzene layer was washed with two 150 cc. portions of cold water, then dried over anhydrous $MgSO_4$. The filtered benzene solution was concentrated on the steam-bath to yield 36.3 grams of nearly colorless p-chlorophenyl chloromethyl sulfide. $N_D^{30}=1.6031$.

*Example 7.—p-Chlorophenyl bromomethyl sulfide.—* Four and one-half (4.5) grams (0.15 M) of paraformaldehyde were mixed with 50 cc. of benzene. Then with stirring 100 grams of 48% hydrobromic acid (0.59 M HBr) was added rapidly. The temperature dropped from 25° C. to 20° C. during the acid addition. The temperature was raised to 35° C. and a solution of 14.5 grams (0.1 M) of p-chlorothiophenol dissolved in 25 cc. of benzene was added dropwise over a twenty-five minute period. The temperature during the addition was kept at 40°–45° C. After warming to 50° C., the mixture was stirred for one hour and fifteen minutes at 48°–52° C. After cooling, the bottom acid layer was withdrawn and the upper benzene layer was washed twice with 100 cc. portions of cold water. After drying over anhydrous MgSO$_4$, and filtering, the benzene was evaporated on the steam-bath. The p-chlorophenyl bromomethyl sulfide was obtained as a slightly yellow colored liquid weighing 21.2 grams. $N_D^{30} = 1.6278$.

In a similar manner, compounds have been prepared wherein R is phenyl, o-chlorophenyl, m-chlorophenyl, m-methyl phenyl, p-methyl phenyl, p-ethoxy phenyl, 2,5-dichlorophenyl, 2,4-dichlorophenyl, 2,5-dimethoxy phenyl, 2,4-dimethylphenyl, 2,4,5-trichlorophenyl and beta naphthyl.

The temperature range for this reaction can vary over a rather wide range, say 20° C.–80° C. At the lower temperatures, longer reaction times are necessary whereas, at the higher temperatures hydrogen chloride loss is uneconomical. The preferred temperature range is from 40°–60° C.

The molar ratio of CH$_2$O to aryl thiol should not be less than 1.1 to 1. A higher ratio of CH$_2$O can be used such as 1.5 to 1, but higher ratios are wasteful and do not apparently increase yield or purity of product. The molar ratio of hydrogen halide to the aryl thiol should not be less than 7 to 1. Higher ratios of acid can be used, but are wasteful.

Although in the above examples paraformaldehyde or formalin has been used, it is obvious that these materials are merely convenient sources of formaldehyde. Other formaldehyde sources such as gaseous formaldehyde and trioxane may also be used.

Although benzene was used as a solvent in the above examples, other solvents such as toluene, xylene, halogenated benzenes and parafinic hydrocarbons can be used.

The compounds of the present invention have been tested and found to be pesticides and are effective against rust, mildew, aphis and the common house fly.

I claim:

1. The process of making a compound of the formula:

wherein R is a member from the class consisting of phenyl radicals, chlorophenyl radicals, bromophenyl radicals, lower alkoxyphenyl radicals and lower alkylphenyl radicals and X is a member from the class consisting of chlorine and bromine comprising: forming a mixture of a member from the class consisting of formalin and paraformaldehyde and a member from the class consisting of hydrochloric acid and hydrobromic acid in the presence of an inert solvent; and slowly adding thereto a member from the class consisting of thiophenols, chloro-substituted thiophenols, bromo-substituted thiophenols, lower alkoxy substituted thiophenols and lower alkyl substituted thiophenols to maintain an excess of acidic material relative to said phenol in the reaction mixture so formed whereby to secure a relatively pure phenyl halomethyl sulfide reaction product wherein the halogen of the halomethyl corresponds to the halogen of the acid used.

2. The process of claim 1 wherein the reaction between the acid and the formaldehyde material takes place at substantially room temperature and the reaction with the thiophenyl material takes place at a temperature of from about 40° to about 60° C.

3. The process of claim 1 wherein the source of formaldehyde is paraformaldehyde.

4. The process of claim 1 wherein the source of formaldehyde is formalin.

5. The process of making p-chlorophenyl chloromethyl sulfide comprising: reacting a member from the class consisting of formalin and paraformaldehyde with hydrochloric acid in the presence of an inert solvent; slowly adding thereto p-chlorothiophenol, said formaldehyde material being proportioned relative to said phenol in at least about a 1.1:1 molar ratio, said acid being proportioned relative to said phenol material in a molar ratio of at least about 7:1; and recovering relatively pure p-chlorophenyl chloromethyl sulfide from the reaction mixture.

6. The process of making p-bromophenyl chloromethyl sulfide comprising reacting a member from the class consisting of formalin and paraformaldehyde with concentrated hydrochloric acid in the presence of an inert solvent and slowly adding thereto p-bromothiophenol, said formaldehyde material being proportioned relative to said phenol in at least about a 1.1:1 molar ratio, said acid being proportioned to said phenol material in a molar ratio of at least about 7:1; and recovering relatively pure p-bromophenyl chloromethyl sulfide from the reaction mixture.

7. The process of making 3-chloro-4-methylphenyl chloromethyl sulfide comprising reacting a member from the class consisting of formalin and paraformaldehyde with concentrated hydrochloric acid in the presence of an inert solvent and slowly adding thereto 3-chloro-4-methyl thiophenol, said formaldehyde material being in a proportion relative to said phenol material in at least about a 1.1:1 molar ratio, said acid being proportioned to said phenol material in a molar ratio of at least about 7:1; and recovering relatviely pure 3-chloro-4-methylphenyl chloromethyl sulfide from the reaction mixture.

8. The process of making o-methylphenyl-chloromethyl sulfide comprising reacting a member from the class consisting of formaldehyde, formalin and paraformaldehyde with concentrated hydrochloric acid in the presence of an inert solvent and slowly adding thereto o-toluene thiol, said formaldehyde material being proportioned relative to said phenol material in at least about a 1.1:1 molar ratio, said acid being proportioned to said phenol material in a molar ratio of at least about 7:1, and recovering relatively pure o-methyl phenyl chloromethyl sulfide from the reaction mixture.

9. The process of making p-methoxyphenyl chloromethyl sulfide comprising reacting a member from the class consisting of formalin and paraformaldehyde with concentrated hydrochloric acid in the presence of an inert solvent and slowly adding thereto p-methoxythiophenol, said formaldehyde material being in a proportion relative to said phenol material in at least about a 1.1:1 molar ratio, said acid being proportioned to said phenol material in a molar ratio of at least about 7:1; and recovering relatively pure p-methoxyphenol chloromethyl sulfide from the reaction mixture.

References Cited in the file of this patent

FOREIGN PATENTS 845,511     Germany _____ July 31, 1952